J. L. Lowry,
Hydrant,
Nº 23,034. Patented Feb. 22, 1859.
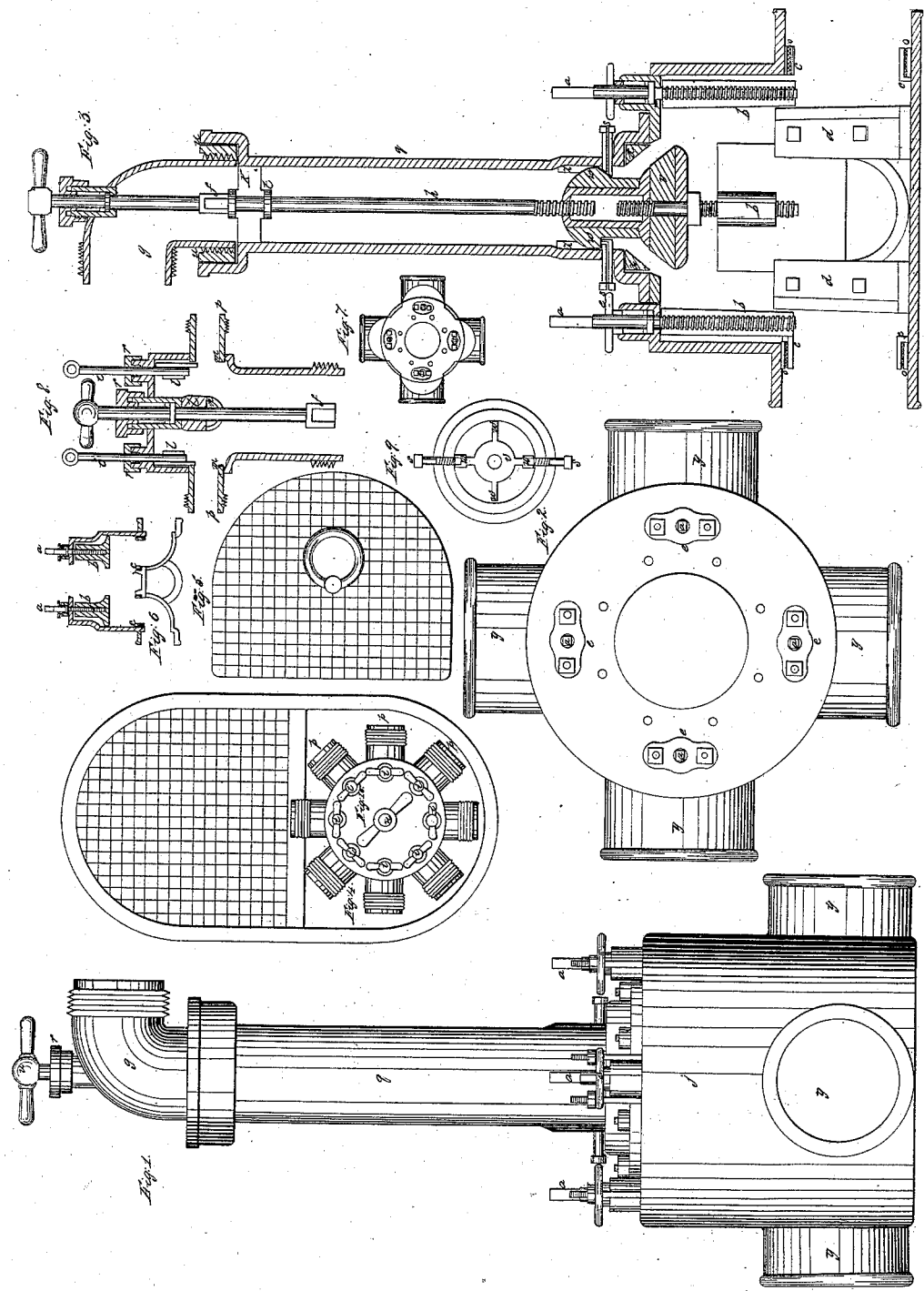

UNITED STATES PATENT OFFICE.

JOSEPH L. LOWRY, OF PITTSBURG, PENNSYLVANIA.

FIRE-PLUG.

Specification of Letters Patent No. 23,034, dated February 22, 1859.

*To all whom it may concern:*

Be it known that I, JOSEPH L. LOWRY, of Pittsburg, in the county of Allegheny, in the State of Pennsylvania, have invented a new and Improved Stop-Cock and Fire-Plug, the stop-cock to shut off the water in the streets while they are repairing or otherwise, and the fire-plug is to supply water in the time of fire; and I do hereby declare that the following is a full and exact description thereof, reference being had to the accompanying drawings and to the letters of reference marked thereon.

Figure 1 is an exterior view of the stop cock, fire plug and the elbow for the steam fire engine put together in the way they are to be used. Fig. 2, is a top view of the stop cock, the plug or cap being lifted off. Fig. 3, is an interior view of the stop cock, fire plug and elbow. Fig. 4, is the frame or caps, that cover the stop cock and fire plug; one of the caps is shown off. Fig. 5, is the cap lifted off, when the plug is in service. Fig. 6 is a view of a stop cock, with puppet valves, cut in two so as to show its interior. Fig. 7, is a top view of the same stop cock. Fig. 8, is a view of the branch for the hose, cut in two, so as to show its interior. Fig. 10, is a top view of the same hose branch screwed on to the plug. Fig. 9, is a cross section of the plug, showing the valve of the same.

*Stop-cock.*—$a\ a$ are the screws or stems which open and shut the valves of the stop cock.

$e\ e$ are the glands or followers.

$y\ y$ are branches or bowls.

$c\ c$ are the valve seats.

$o\ o$ are the rings, fitted into the stop cock.

$b\ b$ are the valves or gates.

$d\ d$ are the back bearings or slides.

*Fire plug*, Figs. 1 and 3.—$v\ v$ is the valve.

$x\ x$ is the valve seat.

$w\ w$ are the wings of the valve.

$s\ s$ are the set screws.

$h\ h$ is the valve rod.

$t\ t$ are the collars.

$u\ u$ is the female screw.

*Elbow or branch for the fire-engine.*—$g\ g$ is the elbow.

$r\ r$ are the glands.

$n\ n$ is the wrench or key.

*Hose branch for the hand engine*, Fig. 8.—$i\ i$ are the valve rods.

$l\ l$ are the valves.

$r\ r$ the glands; $n\ n$ the wrench or key.

$m\ m$ are the valve seats.

$p\ p$ are the screws for hose.

$f\ f$ is the socket to catch the valve rod $h$ of the plug.

To enable others skilled in the art to make and use my invention, I will proceed to describe its construction and operation.

I construct my chamber $j$ for the stop cock, Fig. 2 and parts of 1 and 3, so that four valves or gates $b\ b$ if necessary of the size desired, have sufficient room to operate in one chamber $j$, which chamber may be cast cylindrical or otherwise. Cast on the chamber $j$ are four branches or bowls $y\ y$ to connect with the pipes in the streets, corresponding to those of a cross pipe such as now are in common use. These branches $y\ y$ may be cast on said chamber $j$, close to the bottom, as shown in Fig. 1 and 3, in which case the valve $b$ will have to be shut down in order to close it or stop the flow of water, or said branches $y\ y$ may be cast on said chamber $j$ close to the top, in which case the valve $b$ will have to be raised up to close it, or stop the flow of water in the pipe.

The valve seat $c\ c$ may either be leaded or fitted the ordinary way if desired, but as they are liable to get out of order and attended with a great deal of expense and labor, the stop cock now in general use having to be lifted, requiring the street to be dug open and the pipes cut. To avoid this trouble and expense, instead of leading or pinning in the valve seat $c$ permanently, I fit into the mouth of each branch $y\ y$ in the chamber $j$ a permanent brass ring $o\ o$, Fig. 3, being more easily done than boring out the mouth of the said branch $y$. Inside of this brass ring $o$, I cut a thread which corresponds with a thread cut on the outside of the valve seat $c$. The valve seat $c$ can then be screwed into the ring $o$, similar to the manner in which hose attachments are made, or secondly, instead of cutting a thread on the valve seat $c$ or ring $o$ the valve seat $c$ and ring $o$ can be turned with a slight taper, the larger end of the opening in the ring $o$ being in the interior of the chamber $j$, so that said valve seat $c$ can be tightly set into said ring $o$ from the interior of said chamber $j$, or thirdly, if desired to make greater security, the valve seat $c$ can have a number of screws inserted through the collar or rim of the valve seat $c$, into the brass ring $o$ or chamber $j$, the heads of said screws being sunk so as to cause no obstruction to the working of the valves $b$ (lead or other matter might be used instead of brass, but I do not consider it so secure or permanent), or fourthly, the brass ring can be dispensed with, by boring the branch $y$, so as to form an even face for the valve seat $c$; the mouth of said branch can be bored or cut with a screw so as to answer the purpose for which the ring $o$ is applied. By this arrangement the chamber $j$ and fire plug $q$ being surrounded by a box, such as is now in common use, the fire plug (answering the purpose of a cap to the chamber $j$) can be unscrewed and detached from the chamber or stop cock $j$, leaving an opening sufficiently large, to take out the valve $b$ or the valve seat $c$, or replace the same or insert new ones without disturbing the pipes or any part thereof.

*Fire plug.*—I construct my fire plug, Figs. 1 and 3 $q$ $q$, so as either to sit directly on the main or cross pipes as now used, or on my stop cock $j$, which answers the purpose of a cross pipe. The valve $v$ Fig. 3, and valve seat $x$ is constructed similar to that in use, being a conical shaped leather valve with this difference, on the upper washer that holds together the leather valve, I cast four wings $w$ $w$ of sufficient diameter or width to keep the valve in the center of the fire plug $q$ $q$. A short distance from the upper end, two of the wings $w$ $w$ are constructed in width or diameter so as to form a T or wedge shaped head or shoulder, as is shown in the draft. In the inside of the plug $q$ $q$, close above the valve seat $x$, are cast opposite each other two little guards or slides $z$. Between these slides the wings $w$ $w$ move up and down the guard $z$, preventing the valve $v$ from turning around by motion of the valve rod $h$, between the slides $z$. At the lower end are two set screws $s$ $s$. Through the center lengthwise in one or both there is a small hole drilled, which acts as a waste cock. When the plug $q$ $q$ is shut the wings $w$ $w$ are raised off the set screws $s$ $s$, giving room for the waste water to pass out. When the plug is opened the valve rod $h$ being turned around the collar $t$ $t$, acts against the bar $k$ which is cast in the upper end of the plug $q$ $q$, preventing the rod $h$ from rising or falling. The screw on the lower end of the rod acting in a nut either in the valve $v$ or in a nut cut in the rod $h$ above the valve $v$, forces the valve $v$ down till the wings $w$ $w$ rest on the set screws $s$ $s$, closing the waste cock or hole $s$ $s$, and opening the plug $q$. The upper end of the plug $q$ is cast with a bowl, into this bowl there is fitted a brass screw $w$ $w$ corresponding with a screw on the hose branch Figs. 8, 10, and elbow letter $g$. When the plug $q$ is used, the hose branch or elbow is screwed into the plug $q$ the wrench or key $n$ having a square socket $f$ $f$, which when pressed down catches on the head of the valve rod $h$ $h$, by turning the key or wrench $n$ $n$, the valve $v$, is raised or depressed at pleasure. The elbow $g$ $g$ is a single bent tube or pipe with a screw on each end, the one to screw into the plug $q$ and the other screw $u$ to attach the hose or suction pipe.

The hose branch Figs. 10 and 8 is intended for the use of hose companies and hand engines, and may be cast in one piece, boring out the chamber and use circular valves, or cast the chambers and branches separate. Screws are cut in each end of the branches $p$ $p$, as is shown in Fig. 8, the one to attach the hose $p$ $p$ and the other to screw the branch fast to the chamber. The end that is screwed into the chamber is placed so as to answer for valve seats $m$ $m$. The pressure of the water being from the inside, guards are not needed to keep the valves $l$ $l$ to their seats.

The difficulty in making attachments in time of fire, in entering the male screw $p$ into the female screw, owing to their having the threads continued to the end or point, causing delay and trouble, I would remedy by carrying the thread of the male screw $p$ and female screw $u$ to within one-fourth to one-half inch of the end of either or both of them, so that the male screw $p$ enters sufficiently far, as to keep the screws from slipping and in line with each other.

The difference between my chamber $j$ and the chamber of the stop cock now in use, is, mine is constructed so as to answer the double purpose of the cross pipe and either one, two, three or more of the chambers of the stop cocks now in use, being easier fit up, and not more than half the weight of iron, requiring but one box and cap to cover the whole (viz: fire plug and stop cock), those now in use, being single require the cross pipe to connect them and also a separate box and cap to cover each one of them. They having their valve seats permanently fitted in the chamber cannot be repaired without first digging open the streets and lifting the stop cock. Mine on the contrary is so arranged, that the valve seat can be taken out of the chamber at pleasure without disturbing the pipes or stop cock.

The difference between my fire plug and those in use, is: The latter being set on the pavement and the water pipes being laid in the middle of the street, it requires a pipe extending from said main pipe in the street, to the plug on the pavement to form a connection. When the plug is shut the water in this connecting pipe has no circulation, flow, or motion and freezes in severely cold weather, and the opening in the plug for the emission of water when the hose is attached being but two inches in diameter. On the contrary my plug being set directly on the main pipe or chamber of the stop cock, dispenses with this connecting pipe, and the constant flow of water under the plug prevents its freezing, having the benefit of the four pipes, connecting in said chamber, the combined area of the four four inch pipes (being the smallest now in use) being fifty inches, equal in area to an eight inch pipe, or sufficient to supply the emission of an eight inch plug instead of two inch as now in use, thus dispensing with the necessity of using the quantity of hose now required, as my nearest plug will give a stream of water equal to several plugs, situated in different parts of the city or corporation, to each of which a hose has now to be extended.

My fire plug when placed in the center of the cross streets which is a point of easy access and cannot be mistaken, is not intended to project above the surface, but will be covered with a cap as in Fig. 4. Vehicles can pass over without interruption. The cap covering the stop cock and fire plug.

My valve $b$ Fig. 3, and the one in use differs in this: the latter is faced on both sides with two seats for each valve, the former on the contrary requires to be faced on one side with but one seat—the guards or slides $d$ keeping the valve $b$ up to its seat $c$ instead of the extra face and seat as now required, the screw operating in the valve similar to the valve as in the stop cocks now in use.

Having thus fully described the nature and object of my invention, what I claim therein as new and desire to secure by Letters Patent is—

1. Making a single chamber serve the purpose of a cross pipe, when each main leading into said chamber is furnished with its own stop cock, and access is had to each stop cock through said chamber for repairs &c, thus making one chamber and one cover common to two, three, four, or more mains, substantially as herein set forth.

2. I also claim arranging the fire plug immediately over the chamber, for the purpose of effecting a circulation of the water in the pipe between the main and the fire plug, to prevent its freezing, as herein stated.

3. I also claim in combination with the valve $v$ and its wings $w$, as described, the hollow set screws $s$, for wasting the water from the fire plug when said valve is closed substantially as described.

4. I also claim the removable gasket $c$, in the ends of the branches or bowls $y$, so as to renew the seats for the valves $b$, when necessary without disturbing the main or stop cock, access to these gaskets being through the common chamber $j$, as herein stated.

JOSEPH L. LOWRY.

Witnesses:
W. C. AUGHINBAGH,
JOHN WILKINSON.